United States Patent
Zhang et al.

(10) Patent No.: US 11,579,014 B1
(45) Date of Patent: Feb. 14, 2023

(54) OPTICAL DETECTOR SYSTEM

(71) Applicant: AMAZON TECHNOLOGIES, INC., Seattle, WA (US)

(72) Inventors: Rui Zhang, Sammamish, WA (US); Jeff Clark Adams, Seattle, WA (US); Markus Stefan Duelli, Seattle, WA (US); Donald Mitchell Cornwell, Bellevue, WA (US); Prafulla Masalkar, Sammamish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/998,849

(22) Filed: Aug. 20, 2020

(51) Int. Cl.
  *G01J 1/42* (2006.01)
  *H04B 10/66* (2013.01)
  (Continued)

(52) U.S. Cl.
  CPC .......... *G01J 1/4228* (2013.01); *G01B 11/002* (2013.01); *G01B 11/26* (2013.01);
  (Continued)

(58) Field of Classification Search
  CPC ... G01C 1/00; G01C 9/00; G01C 9/02; G01C 9/06; G01C 2009/066; G01C 25/005; G01B 11/002; G01B 11/03; G01B 11/14; G01B 11/26; G01B 11/27; G01B 11/272; H04B 17/00; H04B 17/11; H04B 17/14;
  (Continued)

(56) References Cited

U.S. PATENT DOCUMENTS 4,574,191 A * 3/1986 Conrad ................... G01S 3/783
  250/203.1
4,870,632 A * 9/1989 Shiono ................. G11B 7/0909
  (Continued)

FOREIGN PATENT DOCUMENTS

WO WO-2015124714 A1 * 8/2015 ............. G02B 7/287
WO WO-2018108440 A1 * 6/2018 ......... G03F 7/70141

OTHER PUBLICATIONS

"Fast Steering Mirror Description", Optics in Motion, Standard and Custom Fast Steering Mirrors, 4 pages. Retrieved from the Internet: URL: https://www.opticsinmotion.net/description.htm.
(Continued)

*Primary Examiner* — Gordon J Stock, Jr.
(74) *Attorney, Agent, or Firm* — Lindauer Law, PLLC

(57) ABSTRACT

An optical detector system provides beam positioning data to an optical tracking system to facilitate optical communications. The optical detector system comprises a plurality of optical photodetectors. For example, a two-by-two array may be used. Incoming light passes through one or more optical elements, such as a lens and a dispersive optical element. A first portion of the beam entering the optical elements is directed into a first spot having a first area on the array. A second portion of the beam entering the optical elements is dispersed to form a second spot having a second area on the array that is larger than the first area. This combination of first portion and second portion of the beam incident on the array provides unambiguous information in the output of the photodetectors that is indicative of a position of the incoming beam with respect to the array.

20 Claims, 7 Drawing Sheets

(51) Int. Cl.
| | |
|---|---|
| *G01B 11/00* | (2006.01) |
| *H04B 17/27* | (2015.01) |
| *G01S 17/66* | (2006.01) |
| *G01S 3/781* | (2006.01) |
| *G01J 1/02* | (2006.01) |
| *G01B 11/26* | (2006.01) |
| *G02B 27/10* | (2006.01) |

(52) U.S. Cl.
CPC ............. *G01J 1/0266* (2013.01); *G01S 3/781* (2013.01); *G01S 17/66* (2013.01); *G02B 27/10* (2013.01); *H04B 10/66* (2013.01); *H04B 17/27* (2015.01)

(58) Field of Classification Search
CPC ........ H04B 17/15; H04B 17/16; H04B 17/18; H04B 17/21; H04B 17/24; H04B 17/27; H04B 10/66; G02B 7/003; G02B 7/004; G02B 7/005; G02B 7/182; G02B 7/1822; G02B 7/1824; G02B 7/1825; G02B 7/1827; G02B 7/183; G02B 23/02; G02B 23/04; G02B 23/06; G02B 26/08; G02B 26/0808; G02B 26/0816; G02B 26/0825; G02B 26/0833; G02B 27/10; G02B 27/108; G02B 27/1086; G02B 27/16; G02B 27/40; G02B 27/4255; G02B 27/62; G02B 27/646; G02B 27/648; G01S 5/16; G01S 17/66; G01S 3/78; G01S 3/7803; G01S 3/781; G01S 7/481; G01S 7/497; G01S 7/4972; G01J 1/0266; G01J 1/4228
See application file for complete search history.

(56) References Cited

U.S. PATENT DOCUMENTS

| | | | | |
|---|---|---|---|---|
| 5,050,153 A * | 9/1991 | Lee | ........... | G11B 7/1353 |
| 5,315,574 A * | 5/1994 | Saimi | ........... | G11B 7/0912 |
| | | | | 369/44.37 |
| 5,353,267 A * | 10/1994 | Katayama | ........... | G11B 7/0943 |
| | | | | 369/44.41 |
| 5,404,344 A * | 4/1995 | Imada | ........... | G11B 7/131 |
| | | | | 369/44.41 |
| 5,475,670 A * | 12/1995 | Hamada | ........... | G11B 7/1353 |
| | | | | 369/103 |
| 5,586,095 A * | 12/1996 | Ichiura | ........... | G11B 7/0903 |
| | | | | 369/112.28 |
| 6,282,164 B1 * | 8/2001 | Katayama | ........... | G11B 7/00718 |
| | | | | 369/112.12 |
| 6,498,330 B1 * | 12/2002 | Yoshida | ........... | G02B 27/0025 |
| | | | | 250/201.5 |
| 6,590,685 B1 * | 7/2003 | Mendenhall | ........... | G01S 3/786 |
| | | | | 250/491.1 |
| 6,798,723 B2 * | 9/2004 | Hayashi | ........... | G11B 7/0903 |
| | | | | 369/44.23 |
| 6,801,350 B2 * | 10/2004 | Glaser-Inbari | ........... | G11B 7/08564 |
| | | | | 359/205.1 |
| 6,873,581 B2 * | 3/2005 | Uemura | ........... | G11B 7/0908 |
| | | | | 369/112.07 |
| 6,873,589 B2 * | 3/2005 | Nakao | ........... | G11B 7/1381 |
| 6,891,791 B1 * | 5/2005 | Gutin | ........... | G11B 7/1353 |
| 6,909,687 B2 * | 6/2005 | Mori | ........... | G11B 7/0903 |
| | | | | 369/112.07 |
| 6,982,821 B2 * | 1/2006 | Hecht | ........... | G02F 1/0121 |
| | | | | 359/237 |
| 7,116,613 B2 * | 10/2006 | Hecht | ........... | G02B 7/003 |
| | | | | 369/44.37 |
| 7,203,138 B2 * | 4/2007 | Sano | ........... | G11B 7/0943 |
| | | | | 369/112.12 |
| 7,313,061 B2 * | 12/2007 | Nishimoto | ........... | G11B 7/131 |
| | | | | 369/44.37 |
| 7,345,820 B2 * | 3/2008 | Park | ........... | G11B 7/1353 |
| | | | | 359/569 |
| 7,359,295 B2 * | 4/2008 | Nakayama | ........... | G11B 7/0943 |
| | | | | 369/112.1 |
| 7,426,172 B2 * | 9/2008 | Kim | ........... | G11B 7/131 |
| 7,489,871 B2 * | 2/2009 | Takahashi | ........... | H04B 10/1125 |
| | | | | 398/129 |
| 7,575,191 B2 | 8/2009 | Layton | | |
| 7,593,306 B2 * | 9/2009 | Kim | ........... | G11B 7/0909 |
| | | | | 369/112.03 |
| 7,606,123 B2 * | 10/2009 | Ono | ........... | G11B 7/0903 |
| | | | | 369/44.41 |
| 7,787,347 B2 * | 8/2010 | Itoh | ........... | G11B 7/1356 |
| | | | | 369/44.23 |
| 7,859,976 B2 * | 12/2010 | Hiraga | ........... | G11B 7/0912 |
| | | | | 369/112.05 |
| 8,295,145 B2 * | 10/2012 | Yamazaki | ........... | G11B 7/1353 |
| | | | | 369/112.12 |
| 8,593,928 B2 * | 11/2013 | Kawamura | ........... | G11B 7/0901 |
| | | | | 369/112.12 |
| 9,784,613 B2 * | 10/2017 | Guehne | ........... | G01S 7/4804 |
| 10,476,591 B2 * | 11/2019 | Laycock | ........... | H04B 10/112 |
| 10,965,379 B2 * | 3/2021 | Brown | ........... | H04B 10/11 |
| 11,329,728 B1 * | 5/2022 | Adams | ........... | H04B 10/532 |
| 11,424,827 B1 * | 8/2022 | Adams | ........... | G02B 27/283 |
| 2004/0027939 A1 * | 2/2004 | Okada | ........... | G11B 7/1353 |
| | | | | 369/44.37 |
| 2006/0175528 A1 * | 8/2006 | Greenaway | ........... | G01J 9/00 |
| | | | | 250/201.9 |
| 2007/0242572 A1 * | 10/2007 | Ogata | ........... | G11B 7/1353 |
| 2007/0280694 A1 * | 12/2007 | Yasumoto | ........... | H04B 10/1149 |
| | | | | 398/119 |
| 2008/0084810 A1 * | 4/2008 | Wada | ........... | G11B 7/1353 |
| | | | | 386/326 |
| 2008/0219119 A1 * | 9/2008 | Izumi | ........... | G11B 7/133 |
| | | | | 369/53.17 |
| 2013/0070239 A1 * | 3/2013 | Crawford | ........... | G01S 17/66 |
| | | | | 356/139.04 |
| 2013/0082162 A1 * | 4/2013 | Eide | ........... | H04B 10/1143 |
| | | | | 250/203.3 |
| 2017/0054499 A1 * | 2/2017 | Graves | ........... | H04B 10/112 |
| 2019/0377267 A1 * | 12/2019 | Oemrawsingh | ........... | G02B 27/4222 |
| 2021/0048566 A1 * | 2/2021 | Kano | ........... | G01V 8/12 |
| 2022/0170783 A1 * | 6/2022 | Kowarz | ........... | G01J 3/502 |

OTHER PUBLICATIONS

"InGaAs PIN Photodiodes", G6849 series, Hamamatsu Photon Is Our Business, Hamamatsu Photonics K.K., Solid State Division, Japan, Cat No. KIRD1042E05, Apr. 2019 DN, pp. 1-4. Retrieved from the Internet: URL: https://www.hamamatsu.com/resources/pdf/ssd/g6849_series_kird1042e.pdf.

Piatek, Slawomir, "Introduction to Photodetectors (Part 1)", New Jersey Institute of Technology & Hamamatsu Photonics, Bridgewater, NJ (USA), May 26, 2020, pp. 1-38. Retrieved from the Internet: https://hub.hamamatsu.com/sp/hc/resources/webinars/Introduction%20to%20photodetectors_part1.pdf.

\* cited by examiner

OPTICAL DETECTOR SYSTEM

BACKGROUND

Wireless transmission of data provides many benefits. Wireless transmission using optical wavelengths such as infrared, visible light, and so forth, facilitates high data rates, and dense networks with reuse of those wavelengths.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
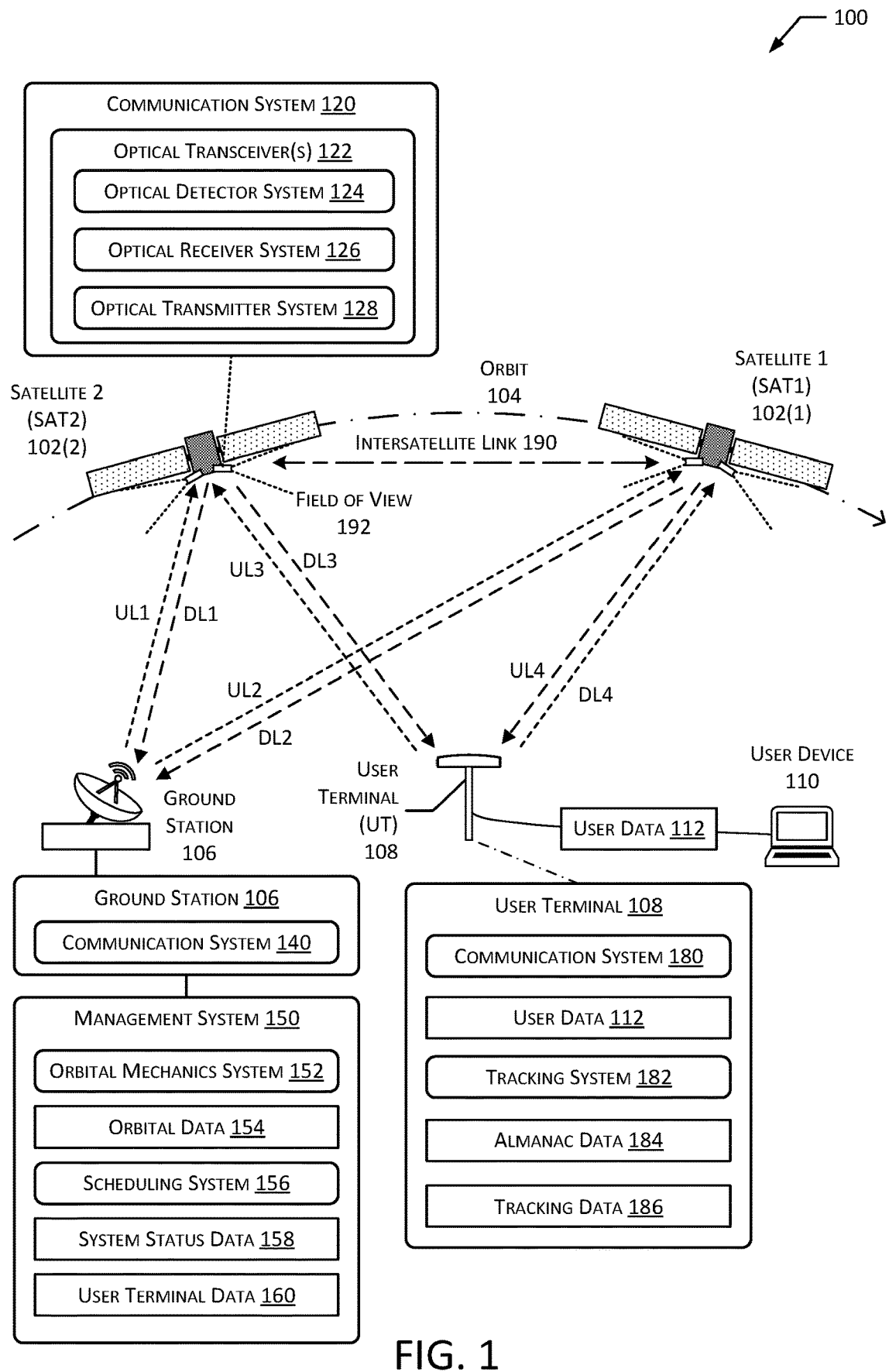
FIG. 1 illustrates a system using ground stations and a constellation of satellites each with an optical transceiver that uses optical wavelengths and an optical detector system to facilitate operation, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

The ability to transmit data wirelessly provides tremendous utility. Wireless transmission uses one or more frequencies of electromagnetic signals, such as optical wavelengths, to send information. Optical wavelengths may include, but are not limited to, infrared wavelengths, visible light wavelengths, ultraviolet wavelengths, and so forth. An optical transceiver comprises a transmitter to send and a receiver to receive signals at optical wavelengths.

Optical wavelengths provide several benefits for data transfer. For example, the high frequencies of optical wavelengths allow high bit rates. Signals at optical wavelengths may be easier to direct in relatively small form factor devices. For example, a telescope may have less volume than a radio-frequency antenna with equivalent gain. Optical wavelengths provide other advantages as well. For example, the same wavelengths may be readily reused simultaneously for communication between different devices, electromagnetic interference from nearby devices may be eliminated, and so forth.

Optical wavelengths may move from one location to another in free space or within a waveguide. Free space may include atmosphere, vacuum, and so forth. In comparison, a waveguide such as an optical fiber may comprise a material such as glass or plastic with an index of refraction such that light at one or more optical wavelengths is propagated within.

A free space optical communication system may be used in a variety of different situations. For example, optical transceivers may be used to provide an intersatellite link between a first satellite and a second satellite, allowing data to be sent from the first satellite to another. In another example, a ground station may communicate with a satellite using an optical transceiver. In still another example, fixed terrestrial stations may communicate with one another using optical transceivers.

As with any system using electromagnetic signals, including optical wavelengths, the received signal must be received with a sufficient signal to noise ratio (SNR) to facilitate the desired communication. As the bit rates increase, the SNR requirements increase as well. By analogy, a person speaking rapidly in a quiet room is much easier to be understood.

To maintain a SNR that allows usable communication over a free space optical communication system, various techniques may be used. At the transmitter, one or more of the transmit power or gain may be increased. An example of increasing the transmit power may involve increasing the brightness of an omnidirectional light source. An example of increasing the gain may be to use reflectors and lenses to direct the light towards a receiver, or to use a directional light source such as a laser that produces a tightly collimated beam of light that is directed towards the receiver.

To provide a needed SNR, at the receiver, a more sensitive detector may be used, or gain may be increased. For example, gain may be increased by using a telescope to acquire light obtained from a relatively large lens and focus that light down to a relatively small detector.

To maintain communication, it is necessary for the transmitter and the receiver to be pointed at one another and maintain that pointing. The transmitter is positioned so that the light from the transmitter is directed towards the receiver. Likewise, the receiver is positioned so that the light from the transmitter is received. For example, the light source that is transmitting needs to radiate light in the direction of the receiver, and the receiver needs to gather that light and process it with a detector.

During operation of a free space optical communication system, it may be necessary to keep the beam from the transmitter precisely pointed towards the receiver, and likewise keep the receiver precisely pointed towards the transmitter. The characteristics that make optical wavelengths useful for data transfer also introduce engineering complications. In particular, the narrowness of the beam of incoming light requires careful pointing of the receiving device to keep that incoming light on the detector of the receiver.

In the ideal situation in which the transmitter and the receiver are not in motion and neither is subject to any sort of vibration, maintaining such careful pointing could be done once and never repeated. However, all structures have some mechanical motion or vibration. A tower may sway in the wind, temperature changes cause materials to contract or expand, a motor elsewhere in the device causes some vibration during operation, and so forth. These motions can result in a failure of the receiver to remain properly pointed at the transmitter. Likewise, these motions can result in failure of the transmitter to remain properly pointed at the receiver. A device that is in motion and using optical communication, such as a satellite in orbit, introduces further complications.

The situation is particularly complex when communication needs to be established frequently and quickly. For example, two satellites in different low earth orbits may only have minutes to establish communication and transfer data before moving out of range or into an unfavorable position.

To account for these motions, some form of active adjustment or feedback may be used. While the following descriptions are given with respect to an optical receiver, similar systems and techniques may be used with an optical transmitter.

An active adjustment may include an optical detector system to provide output about how far a beam of incoming light deviates from a specified reference. The output signal (s) from the optical detector system may then be used to operate actuators affixed to a moveable mirror or other optical element. A feedback loop attempts to keep the incoming light aligned to a particular predetermined point, such as a center of a detector array, but using the output to operate the actuators. For example, the detector array may comprise four photodetectors arranged into a two-by-two detector array. As light impinges on each of the photodetectors, an output signal is generated by the individual photodetector. The photodetectors allow for high sensitivity and high sample acquisition rates during operation. There may be gaps between adjacent photodetectors, resulting in "blind spots" or areas in which no output signal is produced by incident light.

Traditional optical detector systems involve several tradeoffs. Providing the detector array with a wide field of view (FOV) allows a better chance that incoming light will be detected during an acquisition process. However, this wide field of view results in an inability to determine information such as how far from the center of the detector array the spot of incoming light is, impairing ongoing fine tracking. For example, a wide field of view would result in the beam of incoming light having such a small spot size on the detector array that based on output from individual photodetectors, there is not enough information to determine how far away from the center of the detector array the spot is. Continuing the example, if precisely centered and with no gaps between photodetectors, each photodetector would have ¼ of the spot incident, and so the same intensity values would be produced by all four photodetectors. However, as the spot moves away from the center, the spot may soon end up incident only on a single photodetector. The output signal from the single photodetector does not have enough information to determine how far that spot is from the center of the detector array.

One challenge encountered while trying to use such an arrangement to provide input for precision tracking is to avoid overshooting corrections. For example, it is unknown whether the spot is 250 micrometers from the center or 10 micrometers. With this unknown, the moveable mirror may be steered in small increments, such as 5 micrometers at a time, to try and center the incoming light on the detector array. However, this introduces delays while the moveable mirror moves, settles, additional data is acquired and processed, and so forth. In comparison, if distance data was available to indicate that the spot was 250 micrometers from the center, or some value reasonably close, fewer iterations of operating the fast steering mirror (FSM) would be needed. Continuing the example, instead of 50 incremental adjustments, three or fewer adjustments may be used.

Traditional systems may use optical elements with variable or multiple FOV to try and mitigate these problems. A variable FOV system uses actuators and optical elements that move to change the FOV. For example, one or more lenses may move to change focal length, changing from a wide FOV suitable for acquisition to a narrow FOV suitable for tracking. However, this introduces additional cost, complexity, additional mass, additional volume, additional power consumption, and additional failure modes. Operation of actuators in such a system may introduce further vibrations that further complicate pointing. A multiple FOV approach may have a first set of optical elements with a wide FOV suitable for acquisition and a second set of optical elements with a narrow FOV suitable for tracking. However, this approach also includes additional cost, complexity, additional mass, additional volume, additional power consumption, and additional failure modes. While all of these approaches add cost, they also may be prohibitive in a constrained system such as a satellite where mass, volume, power, and reliability are at a premium.

Described in this disclosure are systems and techniques for an optical detector system that can be used with a fixed FOV while still providing data suitable for both acquisition and high accuracy tracking. The optical detector system described provides unambiguous output that is indicative of a relative position of a center of an incoming beam of light relative to the detector array as well as distance of the center of the incoming beam of light relative to the detector array. This information may then be used to operate a moveable mirror or other device to provide active tracking of a beam of incoming light.

The optical detector system described herein includes one or more optical elements. The optical elements provide a non-uniform pattern of light distribution that includes a first portion of the beam, a spot, that is centered and focused, such as expected in a $0^{th}$ order beam. The non-uniform pattern of light distribution that is produced by the optical elements also includes at least a second portion of the beam. This second portion is dispersed across two or more photodetectors in a detector array using one or more dispersive optical elements. An intensity, or power per unit area, within the first portion is greater than an intensity within the second portion. The dispersive optical elements may comprise one or more of diffractive features, microlens arrays, diffusive elements, light guides, and so forth. By dispersing a portion of the incoming beam across two or more photodetectors in most circumstances, signals are generated that provide information that can be used to determine a location and distance of the spot from the center of the detector array. In other implementations, other non-uniform patterns may be used. For example, a third portion of incoming light may be provided.

The system may be used in a variety of applications including, but not limited to intersatellite communications, communications between a satellite and ground station, communications between a satellite and user terminals, between vehicles, between terrestrial stations, and so forth. For example, the system may be used in terrestrial applications, mobile applications, and so forth.

Illustrative System

The ability to communicate between two or more locations that are physically separated provides substantial benefits. Communications over areas ranging from counties, states, continents, oceans, and the entire planet are used to enable a variety of activities including health and safety, logistics, remote sensing, interpersonal communication, and so forth.

Communications facilitated by electronics use electromagnetic signals with various wavelengths, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed. Electromagnetic signals will also experience some spreading or dispersion. Just as ripples in a pond will spread out, a radio signal or a spot of light will spread out at progressively larger distances.

As height above ground increases, the area on the ground that is visible from that elevated point increases. For example, the higher you go in a building or on a mountain, the farther you can see. The same is true for the electromagnetic signals used to provide communication service. A relay station having a radio receiver and transmitter with their antennas placed high above the ground is able to "see" more ground and provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period of time it takes for a satellite to complete a single orbit. A satellite in a geosynchronous orbit at an altitude of 35,800 km may appear to be fixed with respect to the ground because of the period that the geosynchronous orbit matches the rotation of the Earth. In comparison, a satellite in a non-geosynchronous orbit (NGO) will appear to move with respect to the Earth. For example, a satellite in a circular orbit at 600 km will circle the Earth about every 96 minutes. To an observer on the ground, the satellite in the 600 km orbit will speed by, moving from horizon to horizon in a matter of minutes.

Building, launching, and operating a satellite is costly. Traditionally, geosynchronous satellites have been used for broadcast and communication services because they appear stationary to users on or near the Earth and they can cover very large areas. This simplifies the equipment needed by a station on or near the ground to track the satellite.

However, there are limits as to how many geosynchronous satellites may be provided. For example, the number of "slots" or orbital positions that can be occupied by geosynchronous satellites are limited due to technical requirements, regulations, treaties, and so forth. It is also costly in terms of fuel to place a satellite in such a high orbit, increasing the cost of launching the satellite.

The high altitude of the geosynchronous satellite can introduce another problem when it comes to sharing electromagnetic spectrum. The geosynchronous satellite can "see" so much of the Earth that special antennas may be needed to focus radio signals to particular areas, such as a particular portion of a continent or ocean, to avoid interfering with radio services on the ground in other areas that are using the same radio frequencies.

Using a geosynchronous satellite to provide communication service also introduces a significant latency or delay because of the time it takes for a signal to travel up to the satellite in geosynchronous orbit and back down to a device on or near the ground. The latency due to signal propagation time of a single hop can be at least 240 milliseconds (ms).

To alleviate these and other issues, satellites in NGOs may be used. The altitude of an NGO is high enough to provide coverage to a large portion of the ground, while remaining low enough to minimize latency due to signal propagation time. For example, the satellite at 600 km only introduces 4 ms of latency for a single hop. The lower altitude also reduces the distance the electromagnetic signal has to travel. Compared to the geosynchronous orbit, the reduced distance of the NGO reduces the dispersion of electromagnetic signals. This allows the satellite in NGO as well as the device communicating with the satellite to use a less powerful transmitter, use smaller antennas, and so forth.

The system 100 shown here comprises a plurality (or "constellation") of satellites 102(1), 102(2), . . . , 102(S), each satellite 102 being in orbit 104. Also shown is a ground station 106, user terminal (UTs) 108, and a user device 110.

The constellation may comprise hundreds or thousands of satellites 102, in various orbits 104. For example, one or more of these satellites 102 may be in non-geosynchronous orbits (NGOs) in which they are in constant motion with respect to the Earth. For example, the orbit 104 is a low earth orbit (LEO). In this illustration, the orbit 104 is depicted with an arc pointed to the right. A first satellite (SAT1) 102(1) is leading (ahead of) a second satellite (SAT2) 102(2) in the orbit 104.

The satellite 102 comprises a communication system 120. The communication system 120 may include one or more optical transceivers 122. The optical transceiver 122 uses optical wavelengths such as infrared light, visible light, ultraviolet light, and so forth for communication. The optical transceiver 122 may include an optical detector system 124 and one or more of an optical receiver system 126 or an optical transmitter system 128. The optical detector system 124 provides information about a relative alignment of incoming light. This information may then be used to adjust actuators that direct the incoming light into a desired alignment. For example, the optical detector system 124 may determine a distance and direction that the incoming light transmitted by an optical transmitter system 128(2) from the second satellite 102(2) is off center. One or more actuators may be operated responsive to this information to center the incoming light. Output from the optical detector system 124 may be part of a feedback loop that attempts to track the incoming light and maintain a desired alignment of the incoming light. For example, tracking keeps a beam of incoming light centered on a photodetector that is used to detect changes in the incoming light that are used to send data. Operation of the optical detector system 124 is discussed in more detail in the following description.

One or more ground stations 106 are in communication with one or more satellites 102. The ground stations 106 may pass data between the satellites 102, a management system 150, networks such as the Internet, and so forth. The ground stations 106 may be emplaced on land, on vehicles, at sea, and so forth. Each ground station 106 may comprise a communication system 140. Each ground station 106 may use the communication system 140 to establish communication with one or more satellites 102, other ground stations 106, and so forth. The ground station 106 may also be connected to one or more communication networks. For example, the ground station 106 may connect to a terrestrial fiber optic communication network. The ground station 106 may act as a network gateway, passing user data 112 or other data between the one or more communication networks and the satellites 102. Such data may be processed by the ground station 106 and communicated via the communication system 140. The communication system 140 of a ground station 106 may include components similar to those of the communication system 120 of a satellite 102 and may perform similar communication functionalities. For example, the communication system 140 may include one or more optical transceivers 122. In other implementations, the communication system 140 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 106 are in communication with a management system 150. The management system 150 is also in communication, via the ground stations 106, with the satellites 102 and the UTs 108. The management system 150 coordinates operation of the satellites 102, ground stations 106, UTs 108, and other resources of the system 100. The management system 150 may comprise one or more of an orbital mechanics system 152 or a scheduling system 156.

The orbital mechanics system 152 determines orbital data 154 that is indicative of a state of a particular satellite 102 at a specified time. In one implementation, the orbital mechanics system 152 may use orbital elements that represent characteristics of the orbit 104 of the satellites 102 in the constellation to determine the orbital data 154 that predicts location, velocity, and so forth of particular satellites 102 at particular times or time intervals. For example, the orbital mechanics system 152 may use data obtained from actual observations from tracking stations, data from the satellites 102, scheduled maneuvers, and so forth to determine the orbital elements. The orbital mechanics system 152 may also consider other data, such as space weather, collision mitigation, orbital elements of known debris, and so forth.

The scheduling system 156 schedules resources to provide communication to the UTs 108. For example, the scheduling system 156 may determine handover data that indicates when communication is to be transferred from the first satellite 102(1) to the second satellite 102(2). Continuing the example, the scheduling system 156 may also specify communication parameters such as frequency, timeslot, and so forth. During operation, the scheduling system 156 may use information such as the orbital data 154, system status data 158, user terminal data 160, and so forth.

The system status data 158 may comprise information such as which UTs 108 are currently transferring data, satellite availability, current satellites 102 in use by respective UTs 108, capacity available at particular ground stations 106, and so forth. For example, the satellite availability may comprise information indicative of satellites 102 that are available to provide communication service or those satellites 102 that are unavailable for communication service. Continuing the example, a satellite 102 may be unavailable due to malfunction, previous tasking, maneuvering, and so forth. The system status data 158 may be indicative of past status, predictions of future status, and so forth. For example, the system status data 158 may include information such as projected data traffic for a specified interval of time based on previous transfers of user data 112. In another example, the system status data 158 may be indicative of future status, such as a satellite 102 being unavailable to provide communication service due to scheduled maneuvering, scheduled maintenance, scheduled decommissioning, and so forth.

The user terminal data 160 may comprise information such as a location of a particular UT 108. The user terminal data 160 may also include other information such as a priority assigned to user data 112 associated with that UT 108, information about the communication capabilities of that particular UT 108, and so forth. For example, a particular UT 108 in use by a business may be assigned a higher priority relative to a UT 108 operated in a residential setting. Over time, different versions of UTs 108 may be deployed, having different communication capabilities such as being able to operate at particular frequencies, supporting different signal encoding schemes, having different antenna configurations, and so forth.

The UT 108 includes a communication system 180 to establish communication with one or more satellites 102. The communication system 180 of the UT 108 may include components similar to those of a communication system of a satellite 102 and may perform similar communication functionalities. For example, the communication system 180 may include one or more modems, digital signal processors, power amplifiers, antennas (including at least one antenna that implements multiple antenna elements, such as a phased array antenna), processors, memories, storage devices, communications peripherals, interface buses, and so forth. The UT 108 passes user data 112 between the constellation of satellites 102 and the user device 110. The user data 112 includes data originated by the user device 110 or addressed to the user device 110. The UT 108 may be fixed or in motion. For example, the UT 108 may be used at a residence, or on a vehicle such as a car, boat, aerostat, drone, airplane, and so forth.

The UT 108 includes a tracking system 182. The tracking system 182 uses almanac data 184 to determine tracking data 186. The almanac data 184 provides information indicative of orbital elements of the orbit 104 of one or more satellites 102. For example, the almanac data 184 may comprise orbital elements such as "two-line element" data for the satellites 102 in the constellation that are broadcast or otherwise sent to the UTs 108 using the communication system 180.

The tracking system 182 may use the current location of the UT 108 and the almanac data 184 to determine the tracking data 186 for the satellite 102. For example, based on the current location of the UT 108 and the predicted position and movement of the satellites 102, the tracking system 182 is able to calculate the tracking data 186. The tracking data 186 may include information indicative of azimuth, elevation, distance to the second satellite, time of flight correction, or other information at a specified time. The determination of the tracking data 186 may be ongoing. For example, the UT 108 may determine tracking data 186 every 100 ms, every second, every five seconds, or at other intervals.

With regard to FIG. 1, an uplink is a communication link which allows data to be sent to a satellite 102 from a ground station 106, UT 108, or device other than another satellite 102. Uplinks are designated as UL1, UL2, UL3 and so forth. For example, UL1 is a first uplink from the ground station 106 to the second satellite 102(2). In comparison, a downlink is a communication link which allows data to be sent from the satellite 102 to a ground station 106, UT 108, or device other than another satellite 102. For example, DL1 is a first downlink from the second satellite 102(2) to the ground station 106. The satellites 102 may also be in communication with one another. For example, the optical transceivers 122 may be used to provide an intersatellite link 190 that provides for communication between satellites 102 in the constellation. In some implementations the uplink(s) and downlink(s) may use radio wavelengths while the intersatellite link(s) 190 use optical wavelengths.

The intersatellite link 190 allows the satellites 102 to transfer data. This data may include tracking, telemetry, and control data. For example, satellite 102(2) may be out of range of a ground station 106 and sends telemetry data using the intersatellite link 190 to satellite 102(1). Satellite 102(1) then relays the telemetry data to the ground station 106 that in turn sends the telemetry data to the management system 150. The intersatellite link 190 may also be used to send user data 112. For example, if ground station 106(1) is unavailable to handle downlink traffic from satellite 102(1), then satellite 102(1) may use the intersatellite link 190 to send the user data 112 to satellite 102(2) that is in communication with ground station 106(2). In another example, user data 112 from a first UT 108(1) that is addressed to a second UT 108(2) may be sent from the first satellite 102(1) to the satellite 102(X) that is providing service to the second UT 108(2) using the intersatellite link 190.

The satellites 102 within the constellation have different orbital parameters. This results in a variety of possible relative motions between satellites 102 in the constellation. For example, if the satellite 102(1) is in an equatorial orbit at a first altitude and satellite 102(2005) is in a polar orbit at a second orbit, they may only be within communication range of one another for a few minutes. Due to the different relative positions of those satellite 102 with respect to Earth at any given time, satellites 102 in the constellation are affected in various ways. For example, satellite 102(2) may experience a slight increase in altitude from a predicted position due to a slight variation in Earth's gravitational field. In another example, a satellite 102 that is in sunlight will experience light pressure causing some slight movement from a predicted position. Additionally, thermal effects such as expansion and contraction, operation of actuators, and so forth introduce vibration into the structure of the satellite 102.

The optical transceivers 122 have a field of view 192. For example, the field of view (FOV) 192 may be determined based on the focal length of an optical system such as a telescope. In one implementation the FOV 192 describes a solid angle within which incoming light will be acquired and directed to various parts of the optical transceiver 122, such as a detector within the optical receiver system 126. For communication to take place, a first beam of light sent by an optical transmitter system 128(2) of the second satellite 102(2) must be within a first FOV 192(1) of the optical transceiver 122(1) of the first satellite 102(1). For bidirectional communication between the satellites 102, the converse must also be true. Continuing the example, a second beam of light sent by an optical transmitter system 128(1) of the first satellite 102(1) must be within a second FOV 192(2) of the optical transceiver 122(2) of the second satellite 102(2).

Because of the dynamic motion of the satellites 102, variances between predicted positions compared to actual positions, vibration, and other factors, it is advantageous to rapidly acquire incoming light and track that incoming light to maintain communication. The optical detector system 124 facilitates this tracking by providing information as to a relative location of incoming light with respect to a detector array. Output from the optical detector system 124 may then be used to provide for active tracking. For example, output from the optical detector system 124 may be used to adjust a moveable mirror in the optical transceiver 122 to maintain the incoming light in a desired alignment. Continuing the example, the desired alignment may place a spot of the incoming light onto a detector of the optical receiver system 126. In some implementations, the optical transmitter system 128 may utilize a portion of the same optical path. For example, outgoing light from the optical transmitter system 128 may also impinge on the moveable mirror and thus is directed towards optics of the remote optical transceiver 122.

The satellite 102, the ground station 106, the user terminal 108, the user device 110, the management system 150, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Figure 2:
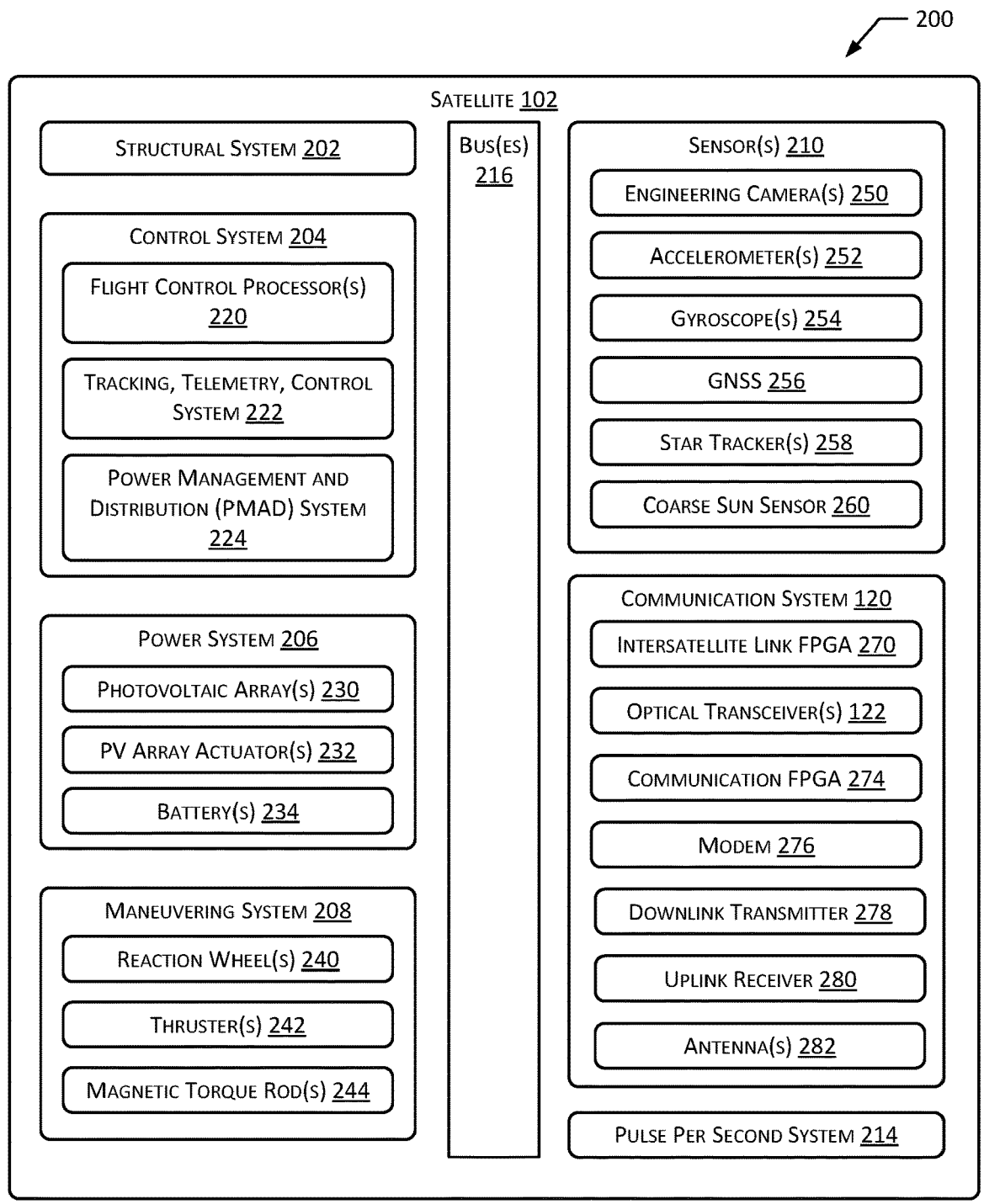
FIG. 2 is a block diagram of some systems associated with the satellite, according to some implementations.

FIG. 2 is a block diagram of some systems associated with the satellite 102, according to some implementations. The satellite 102 may comprise a structural system 202, a control system 204, a power system 206, a maneuvering system 208, one or more sensors 210, and a communication system 120. A pulse per second (PPS) system 214 may be used to provide timing reference to the systems onboard the satellite 102. One or more busses 216 may be used to transfer data between the systems onboard the satellite 102. In some implementations, redundant busses 216 may be provided. The busses 216 may include, but are not limited to, data busses such as Controller Area Network Flexible Data Rate (CAN FD), Ethernet, Serial Peripheral Interface (SPI), and so forth. In some implementations the busses 216 may carry other signals. For example, a radio frequency bus may comprise coaxial cable, waveguides, and so forth to transfer radio signals from one part of the satellite 102 to another. In other implementations, some systems may be omitted or other systems added. One or more of these systems may be communicatively coupled with one another in various combinations.

The structural system 202 comprises one or more structural elements to support operation of the satellite 102. For example, the structural system 202 may include trusses, struts, panels, and so forth. The components of other systems may be affixed to, or housed by, the structural system 202. For example, the structural system 202 may provide mechanical mounting and support for solar panels in the power system 206. The structural system 202 may also provide for thermal control to maintain components of the satellite 102 within operational temperature ranges. For example, the structural system 202 may include louvers, heat sinks, radiators, and so forth.

The control system 204 provides various services, such as operating the onboard systems, resource management, providing telemetry, processing commands, and so forth. For example, the control system 204 may direct operation of the communication system 120. The control system 204 may include one or more flight control processors 220. The flight control processors 220 may comprise one or more processors, FPGAs, and so forth. A tracking, telemetry, and control (TTC) system 222 may include one or more processors, radios, and so forth. For example, the TTC system 222 may comprise a dedicated radio transmitter and receiver to receive commands from a ground station 106, send telemetry to the ground station 106, and so forth. A power management and distribution (PMAD) system 224 may direct operation of the power system 206, control distribution of power to the systems of the satellite 102, control battery 234 charging, and so forth.

The power system 206 provides electrical power for operation of the components onboard the satellite 102. The power system 206 may include components to generate electrical energy. For example, the power system 206 may comprise one or more photovoltaic arrays 230 comprising a plurality of photovoltaic cells, thermoelectric devices, fuel cells, and so forth. One or more PV array actuators 232 may be used to change the orientation of the photovoltaic array(s) 230 relative to the satellite 102. For example, the PV array actuator 232 may comprise a motor. The power system 206 may include components to store electrical energy. For example, the power system 206 may comprise one or more batteries 234, fuel cells, and so forth.

The maneuvering system 208 maintains the satellite 102 in one or more of a specified orientation or orbit 104. For example, the maneuvering system 208 may stabilize the satellite 102 with respect to one or more axes. In another example, the maneuvering system 208 may move the satellite 102 to a specified orbit 104. The maneuvering system 208 may include one or more of reaction wheel(s) 240, thrusters 242, magnetic torque rods 244, solar sails, drag devices, and so forth. The thrusters 242 may include, but are not limited to, cold gas thrusters, hypergolic thrusters, solid-fuel thrusters, ion thrusters, arcjet thrusters, electrothermal thrusters, and so forth. During operation, the thrusters may expend propellant. For example, an electrothermal thruster may use water as propellant, using electrical power obtained from the power system 206 to expel the water and produce thrust. During operation, the maneuvering system 208 may use data obtained from one or more of the sensors 210.

The satellite 102 includes one or more sensors 210. The sensors 210 may include one or more engineering cameras 250. For example, an engineering camera 250 may be mounted on the satellite 102 to provide images of at least a portion of the photovoltaic array 230. Accelerometers 252 provide information about acceleration of the satellite 102 along one or more axes. Gyroscopes 254 provide information about rotation of the satellite 102 with respect to one or more axes. The sensors 210 may include a global navigation satellite system (GNSS) 256 receiver, such as a Global Positioning System (GPS) receiver, to provide information about the position of the satellite 102 relative to Earth. In some implementations the GNSS 256 may also provide information indicative of velocity, orientation, and so forth. One or more star trackers 258 may be used to determine an orientation of the satellite 102. A coarse sun sensor 260 may be used to detect the sun, provide information on the relative position of the sun with respect to the satellite 102, and so forth. The satellite 102 may include other sensors 210 as well. For example, the satellite 102 may include a horizon detector, radar, lidar, and so forth.

The communication system 120 provides communication with one or more other devices, such as other satellites 102, ground stations 106, user terminals 108, and so forth. The communication system 120 may include one or more modems, digital signal processors, power amplifiers, antennas (including at least one antenna that implements multiple antenna elements, such as a phased array antenna), lasers, telescopes, photodetectors, processors, memories, storage devices, communications peripherals, interface buses, and so forth. Such components support communications with other satellites 102, ground stations 106, user terminals 108, and so forth using various wavelengths. The communications may involve multiplexing, encoding, and compressing data to be transmitted, modulating the data to a desired frequency, and amplifying it for transmission. The communications may also involve demodulating received signals and performing any necessary de-multiplexing, decoding, decompressing, error correction, and formatting of the signals. Data decoded by the communication system 120 may be output to other systems, such as to the control system 204, for further processing. Output from a system, such as the control system 204, may be provided to the communication system 120 for transmission.

The communication system 120 may include hardware to support the intersatellite link 190. For example, an intersatellite link FPGA 270 may be used to modulate data that is sent and received by an optical transceiver 122 to send data between satellites 102. The optical transceiver 122 may operate using optical wavelengths.

A communication FPGA 274 may be used to facilitate communication between the satellite 102 and the ground stations 106, UTs 108, and so forth. For example, the communication FPGA 274 may direct operation of a modem 276 to modulate signals sent using a downlink transmitter 278 and demodulate signals received using an uplink receiver 280. The downlink transmitter(s) 278 and uplink receiver(s) 280 may be implemented as a transceiver. The transceiver may be connected to one or more antennas 282.

The satellite 102 may include one or more antennas 282. For example, one or more parabolic antennas may be used to provide communication between the satellite 102 and one or more ground stations 106. In another example, a phased array antenna may be used to provide communication between the satellite 102 and the UTs 108.

The phased array antenna contains many elements and uses slight differences in timing or phase of the signals to produce a beamforming effect that directs a signal to transmit or receive in a particular direction relative to the phased array antenna. For example, a phased array antenna system may include antenna control electronics controlling a radio frequency (RF) feeding network. The RF feeding network may include a plurality of signal conditioning components interposed between antenna elements and the transceivers. The signal conditioning components introduce one or more of a phase modulation or an amplitude modulation to the signal sent to the antenna elements. This introduces a progressive phase modulation and produces interference in the individual transmission of each antenna element, producing directivity or gain in a particular direction. The phase modulation imposed on each antenna element will differ and will be dependent on a spatial location of a communication target that determines an optimum beam vector (e.g., where the beam vector is found by one or more of maximizing signal intensity or connection strength). The optimum beam vector may change with time, such as when a communication target moves relative to the phased array antenna system.

Figure 3:
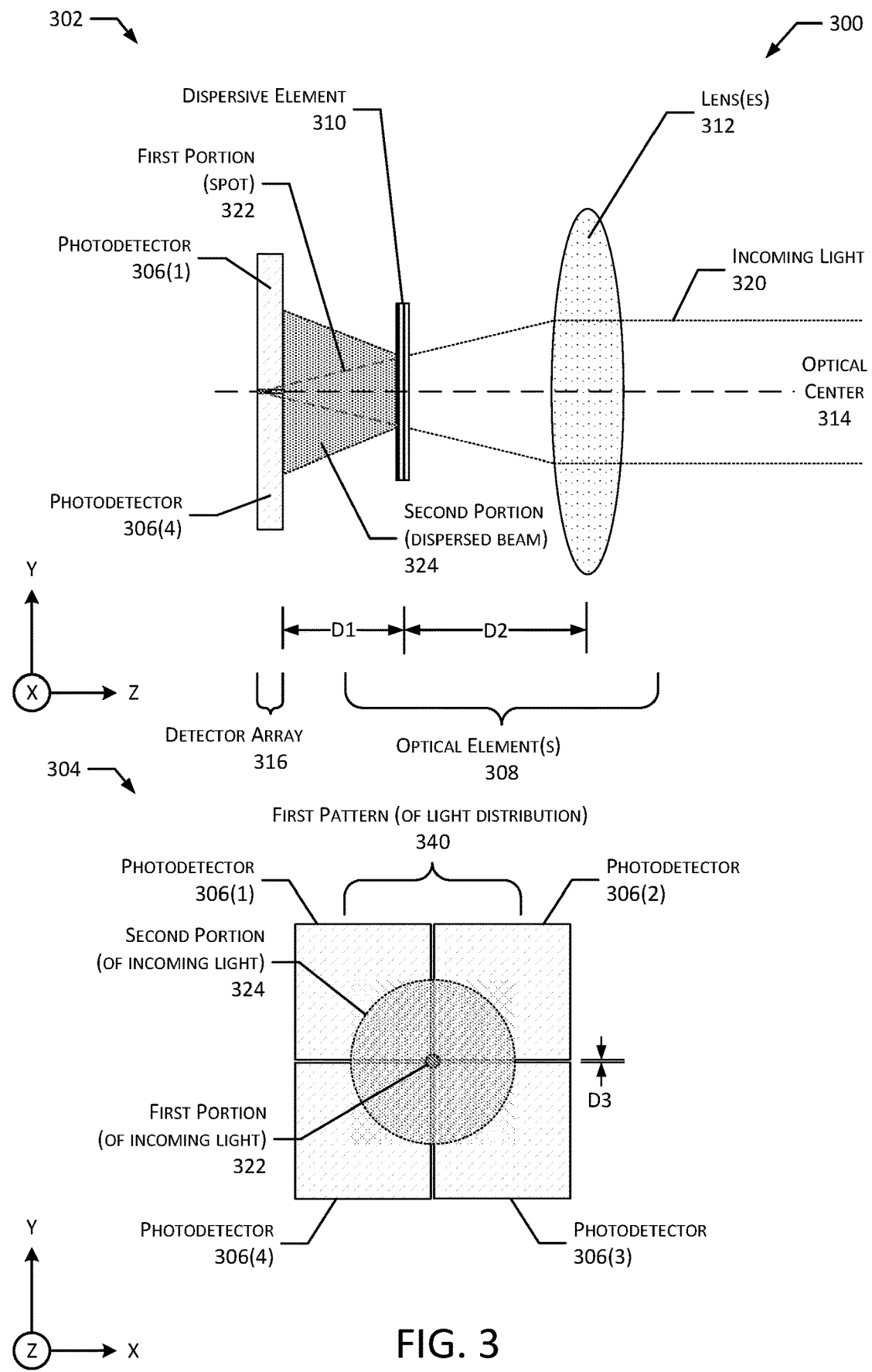
FIG. 3 is a block diagram of a first implementation of the optical detector system with a detector array and a first dispersive element, according to some implementations.

FIG. 3 is a block diagram 300 of a first implementation of the optical detector system 124, according to some implementations. In this illustration a side view 302 of the optical detector system 124 is shown as well as a front view 304 of a detector array 316.

The optical detector system 124 comprises a detector array 316. The detector array 316 comprises a plurality of photodetectors 306. The photodetectors may comprise photomultiplier tubes (PMT), silicon photomultipliers, avalanche photodiodes, and so forth. In one implementation, the detector array 316 may comprise four photodetectors 306 (1)-(4) arranged in a two-by-two array. For example, the detector array 316 may comprise four indium gallium arsenide (InGaAs) photodiodes in a common package, such as the G6849 series from Hamamatsu Photonics K.K. of Japan. As shown in the front view 304, the four photodetectors 306(1)-(4) are arranged such that the first photodetector 306(1) is adjacent to the second photodetector 306(2), the second photodetector 306(2) is adjacent to the third photodetector 306(3), the third photodetector 306(3) is adjacent to the fourth photodetector 306(4), and the fourth photodetector 306(4) is adjacent to the first photodetector 306(1).

In other implementations the detector array 316 may use other arrangements of a plurality of photodetectors 306. For example, if tracking with respect to a single axis is needed, two or more photodetectors 306 may be arranged in a line. In another example, the detector array 316 may comprise an eight-by-eight array of 64 photodetectors 306. In still another example, the detector array 316 may comprise an imaging device such as a charge coupled device (CCD), complimentary metal oxide semiconductor (CMOS) imager, and so forth.

The photodetectors 306 provide as output a signal that is indicative of light incident upon their active area. For example, light incident on an active portion of a photodetector 306 may produce an output current that is proportionate to power of the incident light. Individual photodetectors 306 may be separated from one another by some distance D3. For example, the distance D3 may be 30 micrometers.

The optical detector system 124 includes one or more optical elements 308. These optical elements 308 may include one or more lenses 312 or dispersive elements 310. The detector array 316 and the optical elements 308 may be aligned along an optical center 314. For example, the optical center 314 may be indicative of a line that is centered on the detector array 316 and is perpendicular to a plane of the detector array 316.

The lenses 312 may include one or more of convex lenses, meniscus lenses, concave lenses, and so forth. The one or more lenses 312 may focus incoming light 320 onto the optical center 314 to produce a first portion 322 of the incoming light 320 that results in a spot on the detector array 316. The first portion 322 covers a first area on the detector array 316. Within the first area, a first intensity of incoming light 320 occurs, where the intensity is indicative of power per unit area. For example, the first portion 322 is consistent with a $0^{th}$ order beam of the incoming light 320. When the incoming light 320 is aligned with the optical center 314, the spot of the first portion 322 is centered on the detector array 316, as shown here.

The one or more dispersive elements 310 introduce a dispersion to a portion of the incoming light 320. In one implementation, the one or more dispersive elements 310 may be located in an optical path between the detector array 316 and the one or more lenses 312. In this illustration, the dispersive element 310 is positioned at distance D1 from the detector array 316 along the optical path, centered on the optical center 314. Also shown is distance D2 between the dispersive element 310 and the lens 312. In other implementations, the one or more dispersive elements 310 may be positioned elsewhere within the optical path. The distance D1 between the dispersive element 310 and the detector array 316 may be fixed in some implementations.

The one or more dispersive elements 310 produces a second portion 324 of the incoming light 320. The second portion 324 covers a second area on the detector array 316. This second area is larger than the first area of the first portion 322. The second portion 324 may span a plurality of photodetectors 306. For example, when the incoming light 320 is centered on the optical center 314, the second portion 324 would span the photodetectors 306(1)-(4). Within the second portion 324 that is not coincident with the first portion 322, a second intensity of incoming light 320 occurs. In one implementation, the first intensity of the incoming light 320 in the first area is greater than the second intensity in the second area. For example, light incident on the first portion 322 is associated with a first intensity that is indicative of power per unit area and light incident on the second portion 324 is associated with a second intensity that is lower than the first intensity.

The one or more dispersive elements 310 may comprise one or more diffractive elements, one or more diffusive elements, one or more lenses, a microlens array, and so forth. The one or more diffractive elements may comprise a diffraction grating. For example, the diffraction grating may comprise an etched grating on a fused silica substrate. The one or more diffusive elements may comprise an optical diffuser, such as a transparent substrate with one or more translucent portions. For example, the diffusive elements may comprise a low-density dot diffuser, an opal diffusing glass, ground glass diffuser, diffractive diffuser, and so forth. The one or more lenses may comprise spherical or aspherical lenses in various arrangements. For example, a plurality of concave lenses may be arranged in a planar array, such as twelve-by-twelve, with a central opening through which the first portion 322 of the incoming light 320 may pass unaffected. The microlens array may comprise one or more physical features that refract the incoming light 320 to produce the second portion 324 of the incoming beam. For example, the microlens array may comprise lens features imposed on at least a portion of a substrate. The arrangement, size, packing density, and other aspects of the features may be asymmetrical along one or more axes of the dispersive element 310. For example, a center of the dispersive element 310 coincidence with the optical center 314 may be plano to allow the first portion 322 of the incoming light 320 to be produced, while concentric rings of features of varying size and packing density produce the second portion 324 of the incoming light 320.

In some implementations, a combination of dispersive elements 310 may be used. For example, the dispersive element 310 may comprise a substrate having microlens features on a first side and one or more diffractive elements on a second side that is opposite the first. In another example, the dispersive element 310 may comprise one or more diffusive elements affixed to or integral with the lens 312.

The position of the dispersive element 310 relative to one or more of the detector array 316 or lens(es) 312 may be fixed. For example, the detector array 316 and the dispersive element 312 may be affixed to a common frame to maintain distance D1. By remaining fixed, the mass, complexity, power consumption, and so forth of the optical detector system 124 is improved.

The combination of the first portion 322 and the second portion 324 produces a first pattern 340 of light distribution of the incoming light 320. The first pattern 340 of light distribution is non-uniform, in that intensity differs between the first portion 322 and the second portion 324. As shown here, the first pattern 340 encompasses a significantly greater area than that of the first portion 322 alone. In some implementations, the distribution of incoming light 320 between the first portion 322 and the second portion 324 may be approximately equal. For example, total energy of incoming light 320 within the first portion 322 may be approximately the same as the total energy of incoming light 320 within the second portion 324. In one implementation the energy of incoming light 320 within the first portion 322 may be between 20% and 80% of the total energy of incoming light 320. As described with regard to FIG. 4, this combination of first portion 322 and second portion 324 significantly improves the usefulness of the data produced by the photodetectors 306 in the detector array 316, by providing information indicative of direction as well as a distance between a portion of the incoming light 320 (such as a center), relative to a point on the detector array 316. For example, the direction, the distance, or both may be relative to where the optical center 314 intersects the detector array 316. In one implementation the overall shape of a first pattern 340 is circular, such as shown. In some implementations, there may be a gap or spacing between the first portion 322 and the second portion 324.

Figure 4:
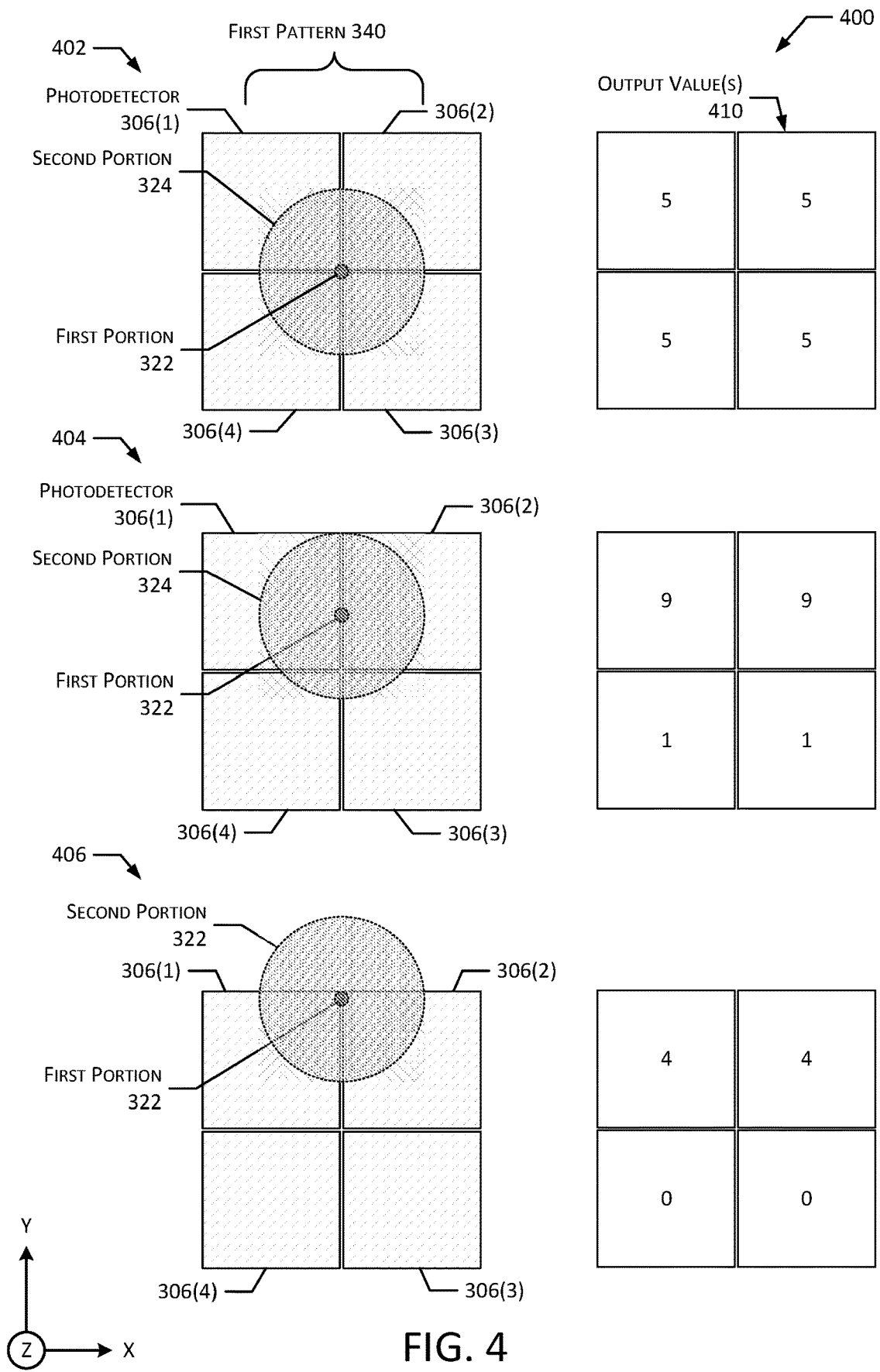
FIG. 4 depicts intensity values produced by the detector array under various configurations of incident light, according to some implementations.

FIG. 4 depicts a scenario 400 of intensity values produced by the detector array 316 under various configurations of incoming light 320, according to some implementations. In this depiction, a first column to the left of the page depicts a front view of the detector array 316 and the first pattern 340 of incoming light 320 on the photodetectors 306 in the detector array 316. A second column depicts output values 410 from the respective photodetectors 306 that would correspond to the configuration of incoming light 320 shown in the first column.

At 402 the first pattern 340 is centered on the detector array 316. The first pattern 340 is evenly divided across the four photodetectors 306(1)-(4). As a result, the corresponding output values 410 of the photodetectors 306 are all equal.

At 404 the first pattern 340 has translated upwards along a Y axis, and remains centered along an X axis. The first pattern 340 is now predominately covering the first photodetector 306(1) and the second photodetector 306(2). However, some of the second portion 324 of the incoming light 320 is incident on the third photodetector 306(3) and the fourth photodetector 306($). As a result, the corresponding output values 410 for photodetectors 306(1) and 306(2) are the same. Likewise, the output values 410 for photodetectors 306(3) and 306(4) are also the same. However, because of the greater incident area on the photodetectors 306(1) and 306(2) of incoming light 320 compared to the photodetectors 306(3) and 306(4), the output values 410 from photodetectors 306(1) and 306(2) are significantly greater than the output values from photodetectors 306(3) and 306(4).

At 406, the first pattern 340 translated further upwards along the Y axis, and is almost bisected by an edge of the detector array 316, with the first portion 322 just within a boundary of the detector array 316. The first pattern 340 now only covers a portion of the first photodetector 306(1) and the second photodetector 306(2). As a result, the corresponding output values 410 for photodetectors 306(1) and 306(2) remain the same, although less than at 404. The output values 410 for photodetectors 306(3) and 306(4) are now zero, as no incoming light 320 is incident on either.

Dispersing a portion of the incoming light 320 so that the likelihood of the incoming light 320 being incident upon, or spanning, two or more photodetectors 306 provides additional data that is otherwise unavailable. For example, consider only the first portion 322 at 404 and 408. Once the first portion 322 moves away from being incident on the third photodetector 306(3) and the fourth photodetector 306(4), insufficient data exists to determine the distance of that spot from the center of the detector array 316. For example, the output values 410 at 404 for the first portion 322 for each of the photodetectors 306(1) and 306(2) may be the same at "10". Continuing the example, at 406 the output values 410 for each of the photodetectors 306(1) and 306(2) remain the same at "10". Without the second portion 324 produced by the one or more dispersive elements 310, the output from the photodetectors 306 remains the same.

Ambiguity with regard to relative position also occurs for a similar region. For example, without the one or more dispersive elements 310 and resulting second portion 324, the spot produced by the first portion 322 provides only rough directional information if that first portion 322 is entirely within an active area of only one photodetector 306. For example, if the first portion 322 is anywhere within the active region of the first photodetector 306(1), the same output value 410 would be produced if that spot was in any of the corners or the center. In comparison, by using the dispersive element 310 and the resulting second portion 324, some incoming light 320 may be for incident two or more photodetectors 306, providing information as to a relative location.

The effects of the dispersive element 310 on the incoming light 320 are known. As a result, it is possible to determine at least a relative distance or displacement of the incoming light 320 relative to a portion of the detector array 316. For example, data structure, algorithm, or other techniques may be used to determine, given the particular output values 410 corresponding to the configuration shown at 406, the distance from the center of the detector array 316 to a center of the incoming light 320.

Figure 5:
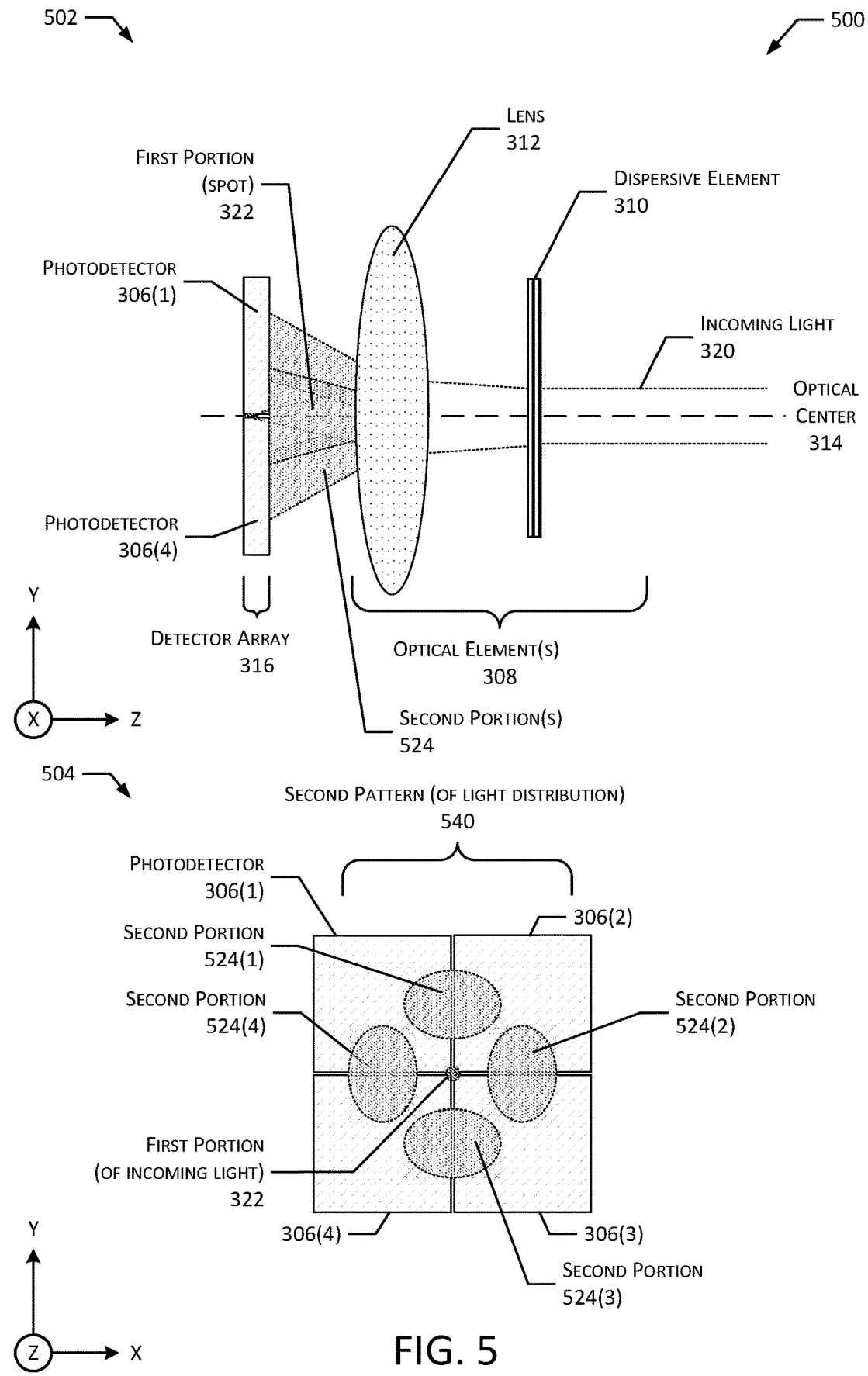
FIG. 5 is a block diagram of a second implementation of the optical detector system with a detector array and a second dispersive element, according to some implementations.

FIG. 5 is a block diagram 500 of a second implementation of the optical detector system 124 with a detector array 316 and a second dispersive element 310, according to some implementations. In this illustration a side view 502 of a second implementation of the optical detector system 124 is shown as well as a front view 504 of the detector array 316. In this implementation, the dispersive element 310 is positioned such that incoming light 320 passes through the dispersive element 310 before reaching the lens 312. In other implementations, the dispersive element 310 may be positioned such that the incoming light 320 passes through the lens 312 before reaching the dispersive element 310.

In this implementation, the first portion 322 remains as described above with regard to FIG. 3. The second portion 524 may span a plurality of photodetectors 306. For example, when the incoming light 320 is centered on the optical center 314, the second portion 524 would span the photodetectors 306(1)-(4) as depicted. The second portion 524 may comprise one or more lobes, or subsections. In the implementation depicted, the dispersive element 310 produces a second portion 524 of the incoming light 320 comprising four lobes. For example, the dispersive element 310 in this implementation may have a different arrangement of one or more microlenses, diffractive features, diffusive features, and so forth compared to the dispersive element 310 that produces the first pattern 340.

This combination of the first portion 322 and the second portion 524 produces a second pattern 540 of light distribution of the incoming light 320 that is non-uniform. The second portion 524 may comprise four lobes 524(1)-(4), as illustrated here. As shown here, the second pattern 540 encompasses a significantly greater area than that of the first portion 322 alone. In the situation where the incoming light 320 is centered along the optical center 314, each of the lobes of the second portion 524 spans at least two photodetectors 306. As described above, this provides output that is indicative of direction and distance of the incoming light 320 relative to a predetermined point on the detector array 316.

In some implementations, there may be a gap or spacing between the first portion 322 and the second portion 524. For example, there is a gap between the first portion 322 and each of the lobes of the second portion 524(1)-(4).

In other implementations other patterns of light distribution may be used. These patterns may or may not be symmetrical. For example, the configuration of the patterns may be constrained such that they are symmetrical with respect to one or more axes of the detector array 316. In another example, the configuration of the patterns may be asymmetrical. This asymmetrical pattern may be compensated for by adjusting or biasing the output values 410. For example, a lookup table or other data structure or function may be used to accept output values 410 produced by an asymmetrical pattern and provide output that compensates for the asymmetry.

Figure 6:
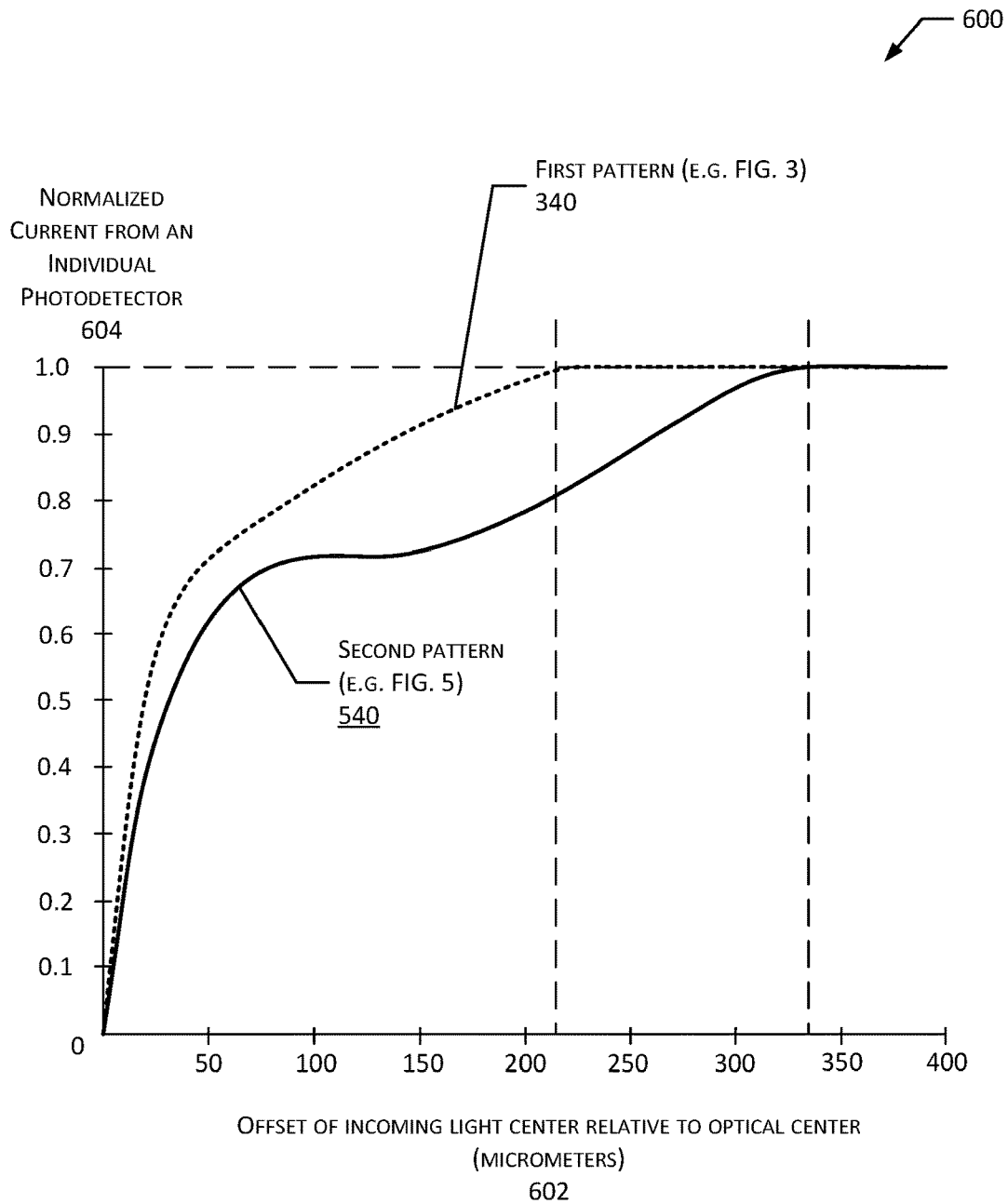
FIG. 6 is a graph of output from a photodetector in a detector array associated with a first pattern and a second pattern of incoming light produced by a dispersive element, according to some implementations.

FIG. 6 is a graph 600 of output from a photodetector 306 in a detector array 316 associated with the first pattern 340 and the second pattern 540 of incoming light 320 produced by respective implementations of the dispersive element(s) 310, according to some implementations.

In this graph, a horizontal axis indicates an offset 602 of incoming light 320 centered relative to an optical center 314. In this illustration, the offset 602 is measured in micrometers. A vertical axis indicates a normalized current 604 from an individual photodetector 306 in the detector array 316. In this illustration, the current 604 has been normalized to a value of between 0.0 and 1.0.

A plot of the first pattern 340 is shown, as well as the second pattern 540. The offset 602 increases as the first portion 322 or spot of the incoming light 320 move away from the center of the detector array 316. As this distance increases, the portion of the incoming light 320 that is incident on the individual photodetector 306 varies, changing a total power of the light incident on the active portion of the individual photodetector 306. This in turn changes the output signal of the photodetector 306 and corresponding output value 410 produced. Depending on the operational requirement desired, the pattern of light produced by the dispersive element 310 may be used to produce a pattern resulting in desired output. For example, the first pattern 340 reaches saturation at an offset 602 of approximately 220 micrometers, while the second pattern 340 reaches saturation at an offset 602 of approximately 330 micrometers. In an implementation where greater precision is needed to determine the distance between 0 and 150 micrometers, the first pattern 340 may be chosen due to the continuous variation in output within that range. In an implementation where a larger offset range is desired, the second pattern 540 may be used due to its larger saturation distance.

Figure 7:
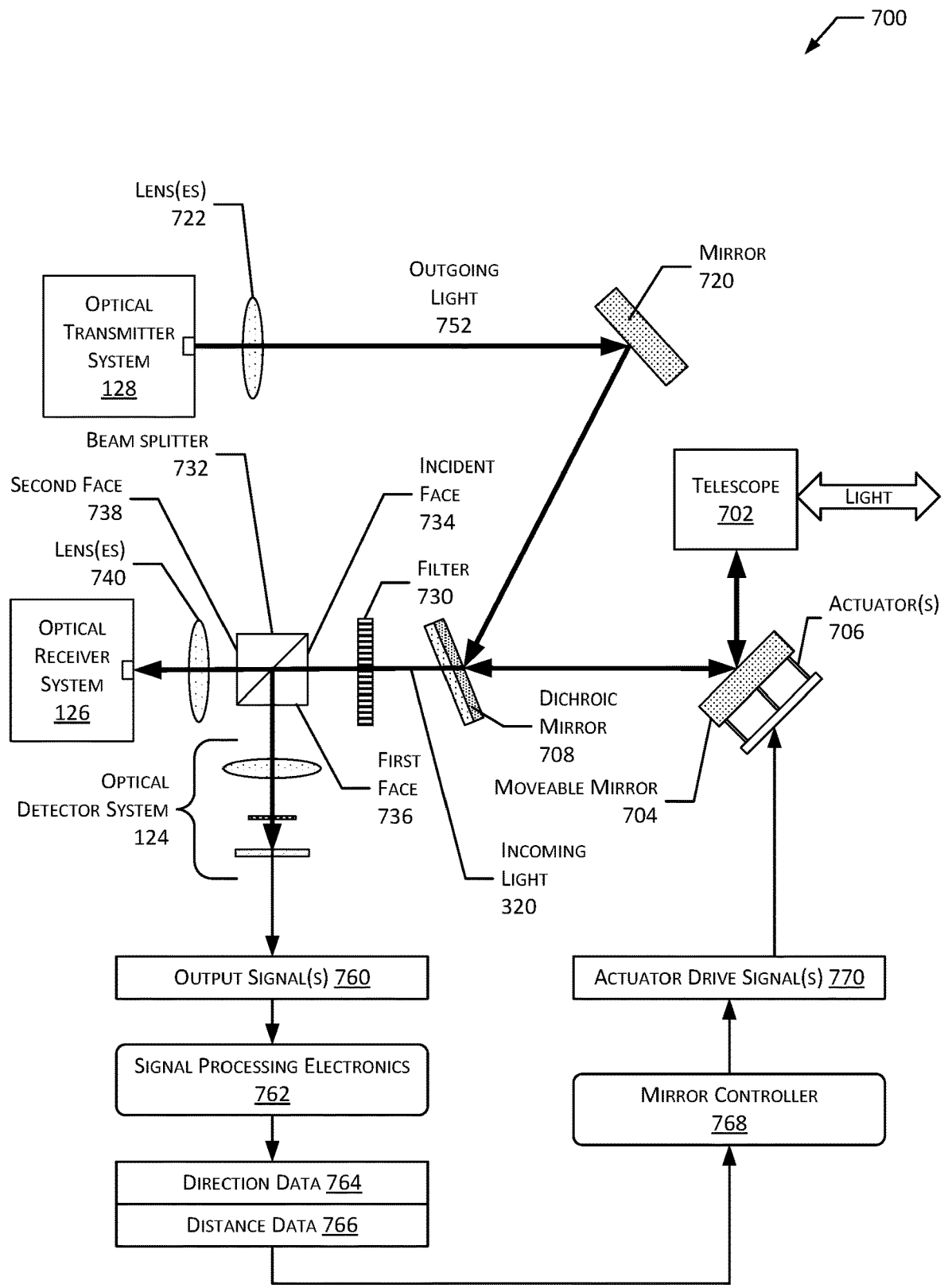
FIG. 7 is a block diagram of the optical transceiver, according to some implementations.

FIG. 7 is a block diagram 700 of the optical transceiver 122, according to some implementations. A telescope 702 or other arrangement of optical elements may be used to acquire incoming light 320 and emit outgoing light 752. An optical path of the optical transceiver 122 may include one or more moveable mirrors 704 with one or more associated actuators 706. During operation, the one or more moveable mirrors 704 may change a path of one or more of the incoming light 320 or the outgoing light 752. In some implementations the moveable mirror 704 and the actuator 706 may comprise a microelectromechanical system. In some implementations the actuators 706 may comprise motors, piezoelectric devices, voice coils, and so forth. For example, a fast steering mirror (FSM) comprising a mirror that is moved based on activation of a voice coil may be used as the moveable mirror 704 and the actuator 706.

A dichroic mirror 708 may be used to selectively direct particular wavelengths of light between the optical transmitter system 128 and the optical receiver system 126. For example, the dichroic mirror 708 may pass incoming light 320 with a first wavelength to the optical receiver system 126 while reflecting outgoing light 752 with a second wavelength.

The optical transmitter system 128 may comprise a light source, such as a light emitting diode, quantum doc, laser, and so forth. The optical transmitter system 128 also includes one or more devices to modulate and amplify light from the light source to produce outgoing light 752. The optical transmitter system 128 accepts data for transmission during operation.

The outgoing light 752 may pass through one or more lenses 722, mirrors 720, and so forth. The outgoing light 752 may be incident to the dichroic mirror 708 and then subsequently is reflected to the moveable mirror 704. The moveable mirror 704 reflects the outgoing light 752 into the telescope 702. The telescope 702 directs the outgoing light 752 towards the receiving optical transceiver 122, such as in another satellite 102, at a ground station 106, and so forth.

The incoming light 320 is directed by the dichroic mirror 708 towards the optical receiver system 126. In some implementations a filter 730 may be in the optical path. The filter 730 may be used to removed unwanted or undesirable wavelengths of light. The incoming light 320 may pass through a beam splitter 732. In this illustration, the beam splitter 732 is depicted as a cubical beam splitter comprising two triangular prisms. In other implementations other beam splitter designs may be used, such as a half-silvered mirror.

In one implementation the beam splitter 732 may have an incident face 734, a first face 736, and a second face 738. For example, the beam splitter 732 may comprise a cubical beam splitter. The incident face 734 is a portion of the beam splitter 732 upon which the incoming light 320 impinges. The first face 736 comprises a portion of the beam splitter 732 from which a first portion of the incoming light 320 is emitted. For example, the first face 736 may comprise the face from which a reflection of the incoming light 320 is directed. The second face 738 comprises a portion of the beam splitter 732 from which a second portion of the incoming light 320 is emitted. For example, the second face 738 may comprise the face from which the incoming light 320 is transmitted or not otherwise reflected and may be directed towards the optical receiver system 126.

The incoming light 320 emitted from the first face 736 passes into the optical detector system 124. The detector array 316 provides as output one or more output signals 760. For example, each photodetector 306 may provide an output signal 760 having a current that is representative of the power of incident light incident on that photodetector 306.

The output signals 760 may be processed by signal processing electronics 762. The signal processing electronics 762 may accept the analog signals from the photodetectors 306 as input and provide as output digital data. For example, the signal processing electronics 762 may comprise one or more of an ammeter, transimpedance amplifier, analog to digital converter (ADC), and so forth. In some implementations the signal processing electronics 762 may include one or more processors. These processors may perform one or more functions, including but not limited to denoising, averaging, and so forth.

The signal processing electronics 762 may provide as output direction data 764 and distance data 766. The direction data 764 may be indicative of a direction of a center of the incoming light 320 with respect to one or more axes and relative to a predetermined point on the detector array 316. For example, the direction data 764 may be indicative of an angle. The distance data 766 may be indicative of a distance of a center of the incoming light 320 with respect to the predetermined point relative to the detector array 316. For example, the distance data 766 may be indicative of a distance in micrometers. In some implementations the direction data 764 and the distance data 766 may be combined. For example, the output from the signal processing electronics 762 may be indicative of a set of cartesian coordinates with respect to the X and Y axes of the detector array 316. A set of coordinates would thus indicate direction and distance of the first portion 322 or spot relative to an origin of the axes, where the origin coincides with the predetermined point such a center of the detector array 316.

The output from the signal processing electronics 762 may be provided to a mirror controller 768. For example, the mirror controller 768 may comprise a processor that accepts the direction data 764 and the distance data 766 and determines a magnitude and direction of movement of the moveable mirror 704. The mirror controller 768 may generate as output one or more actuator drive signals 770. The actuator drive signals 770 may then be used to operate the one or more actuators 706. When operated, the actuators 706 move the moveable mirror 704, changing the path of the light incident thereon.

The system may thus operate in a feedback loop, with the output from the optical detector system 124 resulting in the actuator drive signals 770 that may be used to provide tracking. During tracking, the path of the incoming light 320 is changed by the movement of the moveable mirror 704 to maintain the desired alignment of the incoming light 320. This desired alignment may result in the light entering the optical receiver system 126. For example, by aligning the incoming light 320 with respect to the detector array 316 the incoming light 320 is also aligned with respect to the optical input of the optical receiver system 126.

The incoming light 320 emitted from the second face 738 may pass through one or more lenses 740 before entering the optical receiver system 126. The optical receiver system 126 may comprise one or more optical amplifiers, detectors, demodulators, and so forth. During operation, the optical receiver system 126 may provide data as output.

In other implementations other arrangements of the various components of the optical transceiver 122 or a portion thereof may be used. For example, a combination device that operates as a dichroic filter 708 and beam splitter 732 may be used. In another implementation the filter 730 may be omitted. In some implementations, the optical transmitter system 128 may be omitted and the resulting system is limited to receiving data. In other implementations the optical receiver system 126 may be omitted and the resulting system is limited to transmitting data.

The circuitry, processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet. Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   a detector array comprising:
      a first photodetector;
      a second photodetector;
      a third photodetector; and
      a fourth photodetector;
      wherein the first photodetector is adjacent to the second photodetector, the second photodetector is adjacent to the third photodetector, the third photodetector is adjacent to the fourth photodetector, and the fourth photodetector is adjacent to the first photodetector; and
   one or more optical elements comprising:
      a lens; and
      a dispersive element;
      wherein the one or more optical elements direct incoming light onto:
         a first spot area on one or more of the first, second, third, or fourth photodetectors of the detector array; and
         a second area on one or more of the first, second, third, or fourth photodetectors of the detector array, wherein the second area comprises a plurality of oblong-shaped lobes with each of the oblong-shaped lobes being larger than the first spot area and each of the oblong-shaped lobes being an equal distance from the first spot area.

2. The system of claim 1, wherein the dispersive element comprises one or more of:
   one or more diffractive elements,
   one or more diffusive elements,
   one or more lenses, or
   a microlens array.

3. The system of claim 1, further comprising electronics to:
   determine, based on first output from the first photodetector, second output from the second photodetector, third output from the third photodetector, and fourth output from the fourth photodetector:
      first data indicative of a direction of a center of the incoming light relative to a predetermined point on the detector array; and
      second data indicative of a distance between the center of the incoming light and the predetermined point.

4. The system of claim 1, wherein the dispersive element is fixed at a first distance from the detector array.

5. The system of claim 1, wherein light incident on the first spot area is associated with a first intensity that is indicative of power per unit area and light incident on the second area is associated with a second intensity that is lower than the first intensity.

6. The system of claim 1, further comprising:
   a beam splitter comprising:
      an incident face that receives the incoming light;
      a first face from which a first portion of the incoming light is directed to an optical receiver system; and
      a second face from which a second portion of the incoming light is directed to the detector array;
      wherein the dispersive element is one or more of:
         affixed to the second face, or
         integral to the second face.

7. A system comprising:
   a detector array consisting of a first photodetector, a second photodetector, a third photodetector, and a fourth photodetector; and
   one or more optical elements comprising a dispersive element, wherein the one or more optical elements direct incoming light onto:
      a first area on the detector array; and
      a second area on the detector array, wherein the second area is larger than the first area and the second area comprises a plurality of oblong-shaped lobes and each of the plurality of oblong-shaped lobes being an equal distance from the first area.

8. The system of claim 7, wherein the second area spans two or more photodetectors of the first, second, third, and fourth photodetectors.

9. The system of claim 7, wherein the dispersive element comprises one or more of:
   one or more diffractive elements,
   one or more diffusive elements,
   one or more lenses, or
   a microlens array.

10. The system of claim 7, wherein the plurality of oblong-shaped lobes comprises four oblong-shaped lobes.

11. The system of claim 7, wherein:
   the first photodetector is adjacent to the second photodetector, the second photodetector is adjacent to the third photodetector, the third photodetector is adjacent to the fourth photodetector, and the fourth photodetector is adjacent to the first photodetector.

12. The system of claim 7, further comprising:
   electronics connected to individual ones of the first, second, third, and fourth photodetectors, wherein the electronics generate output indicative of an intensity of light incident on the individual ones of the first, second, third, and fourth photodetectors.

13. The system of claim 7, further comprising electronics to:
   determine, based on output from the first, second, third, and fourth photodetectors:
      first data indicative of a direction of a center of the incoming light relative to a predetermined point on the detector array; and
      second data indicative of a distance between the center of the incoming light and the predetermined point.

14. The system of claim 7, further comprising:
   a mirror;

one or more actuators, wherein the one or more actuators operate to move the mirror; and electronics to:
operate the one or more actuators based on output from the first, second, third, and fourth photodetectors.

15. The system of claim 7, wherein the dispersive element is fixed at a first distance from the detector array.

16. The system of claim 7, wherein light incident on the first area is associated with a first intensity that is indicative of power per unit area and light incident on the second area is associated with a second intensity that is lower than the first intensity.

17. The system of claim 7, further comprising:
a beam splitter comprising:
an incident face to receive the incoming light;
a first face from which a first portion of the incoming light is emitted; and
a second face from which a second portion of the incoming light is directed towards the detector array;
wherein the dispersive element is one or more of:
affixed to the second face, or
integral to the second face.

18. A system comprising:
a plurality of photodetectors; and
one or more optical elements comprising:
a lens; and
a dispersive element;
wherein the one or more optical elements direct incoming light onto:
a first area spanning at least a first portion of one or more of the plurality of photodetectors; and
a second area spanning at least a second portion of one or more of the plurality of photodetectors, wherein the first area excludes the second area, and wherein the second area comprises a plurality of non-overlapping oblong-shaped lobes with each oblong-shaped lobe being an equal distance from the first area.

19. The system of claim 18, wherein the lens and the dispersive element are arranged such that the incoming light passes through the dispersive element before passing through the lens.

20. The system of claim 18, further comprising:
a mirror;
one or more actuators, wherein the actuators operate to move the mirror; and
electronics to:
operate the one or more actuators based on output from the plurality of photodetectors.

* * * * *